US009179528B2

(12) United States Patent
Hochstein

(10) Patent No.: US 9,179,528 B2
(45) Date of Patent: Nov. 3, 2015

(54) NETWORKED LIGHT CONTROL SYSTEM

(75) Inventor: Peter A. Hochstein, Troy, MI (US)

(73) Assignee: RELUME TECHNOLOGIES, INC., Oxford, MI (US)

( * ) Notice: Subject to any disclaimer, the term of this patent is extended or adjusted under 35 U.S.C. 154(b) by 1385 days.

(21) Appl. No.: 12/516,290

(22) PCT Filed: Jul. 17, 2008

(86) PCT No.: PCT/US2008/070264
§ 371 (c)(1),
(2), (4) Date: Nov. 19, 2010

(87) PCT Pub. No.: WO2009/148466
PCT Pub. Date: Dec. 10, 2009

(65) Prior Publication Data
US 2011/0053492 A1    Mar. 3, 2011

Related U.S. Application Data

(60) Provisional application No. 61/059,020, filed on Jun. 5, 2008.

(51) Int. Cl.
*H04B 7/14* (2006.01)
*H05B 37/02* (2006.01)

(52) U.S. Cl.
CPC ............. *H05B 37/0272* (2013.01); *Y02B 20/72* (2013.01)

(58) Field of Classification Search
CPC .. H05B 37/0272; H05B 37/034; Y02B 20/72; Y02B 20/48; H04L 41/0853; H04L 67/025; H04L 67/18; H04W 8/005; H04W 8/26
See application file for complete search history.

(56) References Cited

U.S. PATENT DOCUMENTS

| 4,675,579 A | 6/1987 | Hardy et al. |
| 5,966,658 A * | 10/1999 | Kennedy et al. ........... 455/426.1 |
| 7,333,903 B2 * | 2/2008 | Walters et al. .................. 702/64 |
| 2005/0176406 A1 * | 8/2005 | Krishnakumar et al. ..... 455/410 |

OTHER PUBLICATIONS

Radio Frequency Control Networking: Why Poor Reliability Today Hampers What Could Be a Viable Technology in the Future—Abhay Gupta & Michael R. Tennefoss, Copyright 2005 by Echelon Corporation.

* cited by examiner

*Primary Examiner* — Fanghwa Wang
(74) *Attorney, Agent, or Firm* — Barlow, Josephs & Holmes, Ltd.

(57) ABSTRACT

LED light assemblies (20) are spaced over a geographical territory defined by a central dispatch of public service personnel operating in the geographical territory and are controlled by transmitting digital packets on a first radio frequency reserved for public safety personnel from a central transceiver (24) to repeaters (26) in the geographical territory and re-transmitting the digital packets on a different second frequency reserved for public safety personnel from the repeaters (26) to the light assemblies (20). In turn, the light assemblies (20) transmit digital radio signals on frequencies reserved for public safety personnel to the repeaters (26) for re-transmission to the central transceiver (24). A plurality of emergency signaling devices (36) transmit digital radio signals on the channels of frequencies reserved for public safety personnel to the light assemblies (20) to transmit a radio signal on the reserved frequencies to the central transceiver (24), a 9-1-1 alert or the like.

8 Claims, 2 Drawing Sheets

NETWORKED LIGHT CONTROL SYSTEM

CROSS REFERENCE TO RELATED APPLICATION

This application claims the benefit of application Ser. No. 61/059,020 filed Jun. 5, 2008.

BACKGROUND OF THE INVENTION

1. Field of the Invention

The subject invention relates to a system for transmitting and receiving radio signals to street light assemblies including light emitting diode (LED) arrays.

2. Description of the Prior Art

Proven metrics indicate that at least a fifty percent (50%) energy savings is possible when high-intensity discharge (H.I.D.) street lamps are replaced with properly designed LED light assemblies. The expected life of LED light assemblies can exceed 10-12 years, compared to a nominal 2-3 year life of H.I.D. lamps. An LED retrofit of standard H.I.D. street lights is beneficial for the environment, and the energy related cost savings allow the LED light assemblies to pay for themselves in approximately five years. Energy savings can be even greater with a system for intelligent control and dimming, which further reduces energy consumption and increases the expected life of the LEDs. The unique characteristics of LEDs permits virtually instantaneous on-off cycling, which is impossible with H.I.D. lamps. The LEDs can typically be dimmed up to fifty percent (50%) without a significant change in perceived brightness. In addition, the LEDs do not require a costly dimmable ballast, which is required for each H.I.D. lamp. Therefore, municipalities or other governing organizations in geographical territories are desirous of replacing traditional H.I.D. lamps used in street lights including light emitting diode arrays. The initial cost of purchasing and installing the LED light assemblies is the only barrier preventing them from doing so.

Existing systems which control street light assemblies in geographical territories have proven useful in reducing the energy consumption of H.I.D. lamps, but are an add-on that is cumbersome and expensive to install and maintain. An existing system capable of controlling street lights utilizes an electrical power line modem system using high frequency signaling impressed on existing power conductors. An example of such a system is disclosed in U.S. Pat. No. 4,675,579, assigned to James H. Hardy et. al. The Hardy '579 patent discloses the use of electrical power lines for transmitting carrier signals to traditional street light assemblies, which consume prodigious amounts of electrical power, to control and dim the traditional lights. The carrier signals are transmitted over conductors in underground ducts or on overhead poles from a local controller box to up to a group of fifty (50) street lights sharing an electrical line. The local controller boxes are operated by remote control or programmed clockwork.

As alluded to above, integrating a power line modem system into a municipality or other geographical territory to control and dim street lights including LEDs requires a costly and cumbersome addition to existing infrastructure in the geographical territory. In a typical power line modem system existing today, a group of about one hundred (100) street lights sharing a local controller box, electrical transformer, and electrical line comprise a single communication group, which is effectively isolated from other groups, e.g., by the transformers. Signals cannot reliably cross electrical transformer isolated groups if they do not share a common electrical line. Therefore, the municipality must install a costly modem before the electrical transformer in each group to maintain signal integrity and remotely control the street lights in each group. However, interconnecting all of the modems to a central system controller remains problematic, i.e. the signaling is only useful in relatively small groups of street lights. The municipality may also have to install additional electrical transformers to segregate the street lights into appropriately sized groups. A medium sized municipality with 100,000 street lights might require approximately 1,000 electrical transformers, and 1,000 power line modems. Most municipalities can not afford this huge initial cost.

Another example of such a light control system is a radio mesh system, such as the system disclosed in U.S. Pat. No. 7,333,903 to Jeff. D. Walter. The Walter '903 patent discloses a master controller transmitting and receiving radio signals over a radio frequency to and from traditional street light assemblies. The radio signals from the master controller are received by one of the streets lights and transmitted to the other street lights by a handing-off scheme, whereby they form a network. However, the radio signals are subject to interference from numerous other devices, like portable telephones, microwaves, and video monitors, emitting signals on the same radio frequency, which could easily corrupt the communication. The range of frequencies available for use by commercially sold mesh systems is very limited, and the signals are often subject to multi-path distortion and severe attenuation from building walls, people, and other objects. In addition, the master controller in this type of system is oftentimes incapable of transmitting the radio signals over ranges long enough to control municipal street light assemblies. Therefore, mesh radio systems are not reliable enough for the safety critical control of street light assemblies. A publication by Echelon Corporation, titled *Radio Frequency Control Networking: Why Poor Reliability Today Hampers What Could Be a Viable Technology in the Future*, by Abhay Gupta and Michael R. Tennefoss, discloses the unreliability and other disadvantages of power line systems, mesh radio systems and other existing networked light control systems.

Because it is difficult to transmit radio signals from a central transceiver in a municipality or other geographical territory over a wide geographical territory and into and around buildings, the radio systems used by public safety personnel (police, fire, EMS, etc.) include repeaters which receive and re-transmit radio signals. The repeaters assure a strong radio signal throughout the geographical territory to reach public safety personnel in, under, and around buildings and other objects. For example, repeaters are used to assure safety critical radio signals are received by police in, under, and around the buildings of New York City. The frequencies used by municipalities for public safety personnel are assigned by the FCC and are basically clear channels free of interference from nearby frequencies. These public safety frequencies are used a relatively small percentage of the time for transmitting voice communications.

There remains a great need for a reliable and economical LED light assembly control system for municipal street lights which reduces energy consumption and can be controlled yet is an affordable initial cost for municipalities.

SUMMARY OF THE INVENTION AND ADVANTAGES

The subject invention provides a system for controlling street light assemblies including light emitting diodes (LEDs) and spaced over a geographical territory defined by a central dispatch of public service personnel operating in the geographical territory. The system includes a central transceiver for transmitting and receiving voice and tones and digital data on radio frequencies reserved for public safety personnel. At least one repeater transmits and receives the voice and tones and digital data on the radio frequencies reserved for public service personnel. At least one personnel transceiver for public safety personnel transmits and receives the voice and tones on the radio frequencies reserved for public safety personnel. A plurality of light assemblies including LEDs transmit and receive the digital data on the radio frequencies reserved for public safety personnel to and from the at least one repeater.

In an elective or additional mode, the system includes a plurality of emergency signaling devices integrated into the system for broadcasting an emergency digital radio signal on the channels of radio frequencies reserved for public safety personnel to at least one of the light assemblies.

The subject invention also provides a method for transmitting and receiving radio signals to street light assemblies including LEDs spaced over a geographical territory defined by a central dispatch of public service personnel operating in the geographical territory. The method includes transmitting voice and tones and digital data on radio frequencies reserved for public service personnel between a central transceiver and at least one repeater. The method also includes transmitting the voice and tones on the radio frequencies reserved for public safety personnel between the at least one repeater and at least one personnel transceiver for public safety personnel, and transmitting the digital data on the radio frequencies reserved for public service personnel between the at least one repeater and a plurality of light assemblies including LEDs.

In an elective or additional mode, the method includes broadcasting an emergency digital radio signal on the channels of radio frequencies reserved for public safety personnel from an emergency signaling device to at least one of the LED light assemblies.

Adavantage Of The Invention

The subject invention has the enormous advantage of providing governing organizations in a geographical territory, such as municipalities, counties, and universities, with a simple, reliable, and cost-effective system to replace traditional H.I.D. lamps with LED light assemblies in existing street lights by integrating a remote light control system into their existing radio communication system used for public safety personnel, i.e. without the prohibitive cost of installing an independent and additional radio communication system and the attendant operational disadvantages. A municipality can install and operate the present system at virtually no added cost by using the proven, robust, existing municipal transceivers and repeaters, used for public safety personnel communication, and the existing radio frequencies licensed and reserved to the municipality by the FCC for public safety personnel communication, which are frequencies free of interference. There is no need to make costly changes to existing municipal infrastructure, which is needed to integrate power line modem systems.

The radio frequencies employed in the system are used solely for radio transmissions controlled by the governing organization of a political geographical territory, such as municipalities, counties, and universities, and those frequencies are sufficiently spaced from other frequencies outside of the governing organization's control. Therefore, the radio signals are rarely used to capacity and are not subject to interference from other devices, uncontrolled by the governing organization and transmitting radio signals on the same or near frequencies, which occurs in mesh radio systems. By transmitting signals on the radio frequencies reserved for public safety personnel, the communication is protected from "hacking" and corruption, which is also a problem in mesh radio systems. The radio signals can also be encoded with data or encrypted to prevent interference or "hacking." Radio signals transmitted on the frequencies reserved for public safety personnel encounter minimal signal attenuation from building walls, people, and other objects, and have proven to be extremely reliable over the past fifty (50) years. Employing the geographical territory's existing robust repeaters, already used for public safety communication to transmit the radio signals on the reserved channels, guarantees full coverage over the geographical territory so that the system is reliable enough for the safety critical operation of municipal street lights.

The digital packets transmitted to and from the light assemblies comprise a short burst of data occupying the reserved radio channel for only milli-seconds so that they do not interfere with the voice and tone radio signals transmitted to and from public safety personnel on the same reserved radio channel. The signals transmitted to and from the street light assemblies can also include a continuous tone-coded squelch system tone (CTCSS tone) for further preventing interference with public safety personnel communications. In addition, the FCC severely limits out of band interference so that other radio systems are not affected.

The energy-related cost savings obtained by integrating the system and method of the present invention into a geographical territory's existing infrastructure quickly and reliably offsets the costs of replacing traditional H.I.D. lamps with LED light assemblies. The system allows a governing organization in a geographical territory to selectively control and dim individual or groups of street lights in a reliable manner to reduce energy-related costs and increase the useful life of the LEDs and ascertain proper operational power levels and actual "on" times. The bi-directional communication capabilities of the present invention allow each street light assembly to reliably communicate its status, including failure, irregular operation, and temperature, to a central system controller so that malfunctioning street light assemblies can be promptly repaired, which is a useful safety advantage. The governing organization is also able to use these capabilities to survey the operational status of each street light assembly. The bi-direction communication capabilities eliminate the need for a municipal employee to monitor the street lights, which saves even more costs for the municipality.

Digital addresses can be assigned to each street light assembly so that select light assemblies or groups of light assemblies can be dimmed during certain time periods to save more energy and energy-related costs. The digital addresses also allow the governing organization in a geographical territory to flash specific lights to direct public safety personnel to the location of an emergency or to direct citizens out of a city during a dangerous situation. A governing organization can also change the color of specific street lights to signify a severe weather condition or emergency situation. All control of the individual and groups of light assemblies is completely independent of the electrical power grid supplying electrical energy to the light assemblies and the electrical grouping of the light assemblies in the power grid.

In the elective or additional mode, emergency signaling devices, like key fobs, can be integrated into the system and distributed to individuals residing in the geographical territory. If an individual is in trouble, the unique digital coding of the emergency signaling device can be activated to transmit an emergency digital radio signal to the nearest street light assemblies. In response, the street light assemblies transmit an emergency digital radio signal to the geographical territory's central system controller so that the central system controller can determine the location of the emergency signaling device and provide an optimal emergency response.

To make installation of LED light assemblies and integration of the present invention even more cost effective, the emergency signaling devices (key fobs) can be sold to individuals to generate substantial revue for the municipality and offset initial installation costs. For example, installing the system with the LEDs and emergency signaling devices in a municipality having six million people requires retrofitting about sixty thousand street lights, each costing about one thousand dollars ($1,000), for a total of sixty million dollars. The payback for the system would be approximately four years via energy-related cost savings. However, selling an emergency signaling device to each of the six million people for a profit of only ten dollars ($10) each would generate the sixty million dollars.

Clearly, the integration of the system with the frequencies reserved for public safety personnel provides enormous cost savings and allows municipalities to install such systems with a four to five year pay back. Additionally, by incorporating the emergency signaling devices, not only is public safety substantially enhanced, but there resides an additional opportunity for revue to offset the initial installation costs. In conclusion, the present system contributes an art-additive to society that reliably and economically improves energy efficiency, reduces energy-related costs, and improves the safety of citizens.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
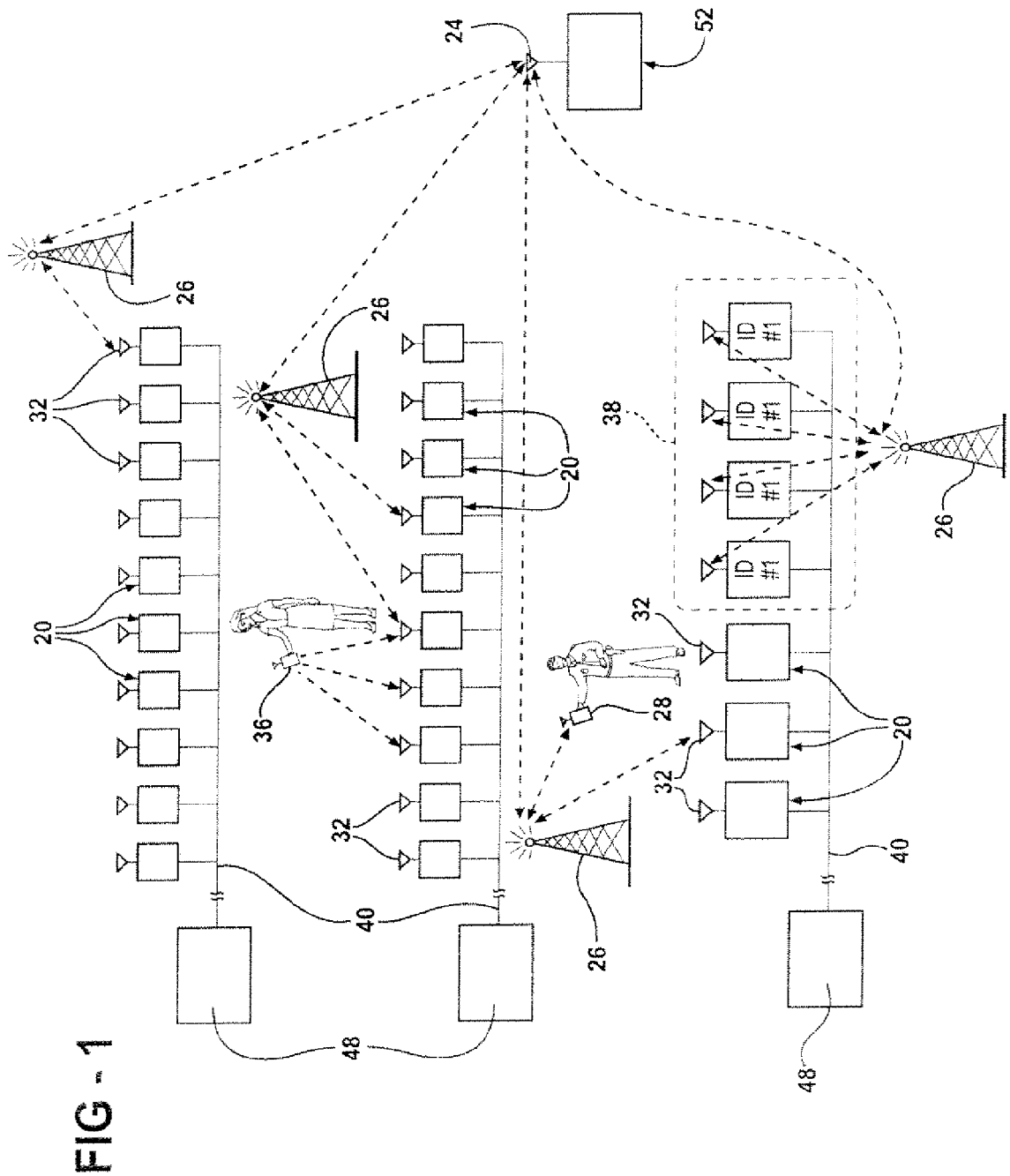
FIG. 1 is schematic view of the networked light control system.

Referring to the Figures, a networked light control system used to transmit and receive radio signals to and from street light assemblies (20) including LEDs (22) is illustrated as spaced over a geographical territory defined by a central dispatch of public service personnel operating in the geographical territory. The system of the present invention employs existing infrastructure designed for transmitting radio signals on channels of frequencies licensed and reserved by the FCC for public safety communication and other exclusive local uses to control street light assemblies (20) located in a geographical territory such as a municipality, county, or university campus.

The system employs a central transceiver (24), operated by a governing organization in a geographical territory for transmitting and receiving voice and tones and digital packets on a first radio frequency reserved for public safety personnel. The central transceiver can be an existing transceiver located in the geographical territory for transmitting to and from public safety personnel responsible for that geographical territory, e.g., police, firemen, EMS, animal control, or other service personnel. The central transceiver (24) can also be a separate transceiver dedicated to the LED light system and operating on the same reserved frequencies and in parallel with the transceiver for the public service personnel. The central transceiver (24) comprises a transmitter and receiver integral with or interfacing one another.

At least one repeater, but typically a plurality of repeaters (26) each comprising a remote receiver and transmitter are spaced throughout the geographical territory. The repeaters (26) are part of the existing infrastructure for receiving the voice and tones and digital packets on the first radio frequency and re-transmitting the voice and tones and digital packets on a different second radio frequency, also reserved for public safety personnel. The different second radio frequency is spaced from the first frequency, typically by 5 MHz. The repeaters (26) transmit the voice and tones and digital packets at a higher power than they receive them, which allows the communication to travel long distances without attenuation. The repeaters (26) can be ultra high frequency (UHF) repeaters (26), and larger geographical territories typically have dozens of UHF repeaters (26) throughout the territory to essentially blanket the geographical territory with radio coverage. For example, repeaters (26) are used in New York City to assure police officers receive safety critical radio signals in, under, and around the buildings. Some geographical territories have repeaters (26) on mountains to further assure reliable radio coverage.

A plurality of existing personnel transceivers (28), comprising a receiver and transmitter integral with one another, are located throughout the geographical territory. The personnel transceivers (28) are located with the public safety personnel, such as police officers, and are typically pocket-sized, reliable, and high powered for efficiently transmitting safety critical communications over the entire geographical territory. The personnel transceivers (28) receive the voice and tones on the second radio frequency from the repeaters (26). Public safety personnel transmit voice and tones from their personnel transceivers (28) on a first personnel radio frequency reserved for public safety personnel to the repeaters (26) for re-transmission on a different second personnel radio frequency reserved for public safety personnel to the central transceiver (24).

A plurality of light assemblies (20) including LEDs (22) protected by a housing (30) are spaced throughout the geographical territory for lighting streets, sidewalks, and other populated areas. Typically, two LED (22) modules, each comprising several LEDs (22), are disposed in each light assembly (20). Each of the light assemblies (20) include a light transceiver (32) disposed in the housing (30), which employ the same reserved channels of frequencies licensed by the FCC for public safety personnel as the existing personnel transceivers (28) operating in the geographical territory. However, the light transceivers (32) are primarily for transmitting and receiving digital radio signals having digital packets encoded with digital data for controlling the light assemblies (20), rather than transmitting and receiving voice and tones. The light transceivers (32) can employ the same existing infrastructure as the personnel transceivers, including the central transceiver (24) and repeaters (26). The light transceivers (32) comprise a receiver for receiving LED radio signals having digital packets encoded with digital data on the second radio frequency from the repeaters (26). The light transceivers (32) also comprise a transmitter, integral with or interfacing the receiver, for transmitting digital radio signals encoded with digital data on a return radio frequency reserved for public safety personnel to the repeaters (26) for re-transmission on a different return radio frequency reserved for public safety personnel to the central transceiver (24).

All of the radio signals transmitted between the central transceiver (24), repeaters (26), and light transceivers (32), i.e., voice signals, tones, digital packets, digital radio signals, LED radio signals, emergency digital radio signal, emergency LED radio signal, etc., are transmitted on channels of frequencies licensed and reserved by the FCC to a governing organization in a geographical territory for public safety personnel communications and other exclusive local uses.

All of the frequencies employed during the transmission of radio signals between the light transceivers (32) and central transceiver (24) are on the channels of frequencies licensed and reserved by the FCC to a governing organization in a geographical territory for public safety personnel communications and other exclusive local uses, i.e., first radio frequency, different second radio frequency, return radio frequency, etc. The radio frequencies employed during the transmission of radio signals from the light transceivers (32) to the central transceiver (24) are typically the same pair of radio frequencies employed during the transmission of radio signals from the central transceiver (24) to the light assemblies (20), i.e., the return radio frequency is the same as the first radio frequency. Alternatively, different pairs of radio frequencies, both being on the channels of frequencies reserved for public safety personnel, can be employed. Also, the pair of radio frequencies employed during the transmission of radio signals to and from the light transceivers (32) is typically the same pair of radio frequencies employed during the transmission of radio signals to and from the personnel transceivers (28) with public service personnel. Alternatively, different pairs of radio frequencies, both being on the channels of frequencies reserved for public safety personnel, can be employed. The frequencies employed in the system are spaced from other frequencies, i.e., frequencies uncontrolled by public safety personnel, to prevent interference and corruption. Conversely, the FCC severely limits the range of frequencies employed in the present system so that other radio systems, such as cell phone communications, operating in the geographical territory are not adversely affected. In a more specific embodiment, the radio frequencies comprise a pair of UHF frequencies in the 450 to 470 MHz band, which are typically reserved for police officer communications. However, the frequencies may comprise other pairs of frequencies or a range of frequencies licensed and reserved by the FCC for public safety personnel, including very high frequencies (VHF) with the repeaters so allocated. Larger territories have hundreds of frequencies licensed and reserved by the FCC for serving the territory's numerous political departments. The territory can determine the optional frequency pair for the system by evaluating existing FCC licenses, evaluating the usage profile for each frequency, measuring the performance of the potential frequency pairs over the full geographical territory, and running test modules on the chosen frequency pairs.

The radio signals of the present system can be encoded with data or encrypted to eliminate interference or "hacking," so that the system is reliable enough for the safety critical operation of street lights. The digital packets are transmitted at an appropriate baud rate, such as 1.2 or 2.4 Kbd, to prevent interference from the voice and tones transmitted to and from public safety personnel. Conversely, the voice and tones, which are typically transmitted from police offices and are also safety critical, are not interfered by the digital radio signals transmitted to and from the light assemblies (20) because the digital radio signals comprise a short burst of digital data occupying the reserved frequencies for milliseconds of time and can also include a CTCSS tone.

Each light assembly (20) includes a microprocessor (34) disposed in the housing (30) of the light assembly (20) and interfacing the light transceiver (32). The "microprocessor" as used in this application shall include various combinations, e.g., the microprocessor circuit, ancillary firmware, software, and necessary memory to perform programmed logical functions. It is, therefore, to be understood that reference to the "microprocessor" encompasses the microcomputer function of various discrete components. Digital packets received by the light transceivers (32) are electronically transferred to the associated microprocessors (34) for processing, storing, and actuating the light assembly (20) to perform a specific operation. As alluded to above, the microprocessors (34) are also capable of generating digital data pertaining to the operational status of each light assembly (20), initiating the transmission of radio signals, and performing other intelligent functions. Each microprocessor (34) is also capable of interfacing two external switches for emergency signaling devices (36), which will be discussed further.

In a more specific embodiment, each microprocessor (34) is assigned a fixed digital address which can be encoded in the LED radio signals to control select light assemblies (20) independent of the other light assemblies (20) regardless of how the light assemblies (20) are grouped electrically. The fixed digital addresses are similar to serial numbers, which can be assigned during manufacturing or when the microprocessors (34) are installed in the light assemblies (20). The fixed digital addresses usually remain the same throughout the life of the microprocessors (34). Each microprocessor (34) can also be assigned a dynamic digital address, being the same dynamic digital address as at least one other microprocessor (34), to segregate the light assemblies (20) into operational groups (38). The dynamic digital address is also encoded in the LED radio signals to control select operational groups (38) independent of other light assemblies (20) or operational groups (38). For example, a select light assembly (20) or group (38) of light assemblies (20) can be turned on at a different time of day than the other light assemblies (20), the LEDs (22) of light assemblies (20) in remote areas can be dimmed, LEDs (22) of select light assemblies (20) can flash to direct citizens to a specific geographical location, and the color of the LEDs (22) of a select light assembly (20) can be changed to signify the location of a dangerous situation. All control of the individual and operational groups (38) of light assemblies (20) is completely independent of the electrical power grid (40) supplying electrical energy to the light assemblies (20) and the electrical grouping of the light assemblies (20) in the power grid. The dynamic digital addresses can be eliminated or changed according to the needs of the political territory. Also, the microprocessors (34) can be programmed to reject radio signals encoded with digital addresses other than their own. The digital addresses are encoded in the digital radio signals transmitted from the light assemblies (20) to the central transceiver (24) for identifying the light assemblies (20) transmitting the digital radio signals. However, the light assemblies (20) can be identified in other ways.

Each microprocessor (34) includes a condition sensor (42) for sensing the condition of the light assembly (20). The condition sensor (42) is able to determine the temperature of the light assembly (20), panel failure, LED (22) current, ambient temperature, ambient light, and other operational conditions. The microprocessors (34) initiate digital radio signals encoded with digital data representing the condition of the light assembly (20) for transmission to the central transceiver (24). Each microprocessor (34) also includes a storage unit (44) for storing digital data, including the condition of the light assembly (20), digital addresses, and geographical location in latitude and longitude of the light assembly (20).

A light control module (46) is disposed within the housing (30) and interfaces the microprocessor (34) of each light assembly (20) for controlling the flow of electricity supplied to the LEDs (22). The light control module (46) is actuated by the microprocessor (34) in response to digital data encoded in the LED radio signals. The light control module (46) is capable of dimming the light assembly (20) from zero to one hundred percent (0-100%) intensity with an essentially loss-free-duty cycle-control. As alluded to above, it can also turn the LEDs (22) on and off, flash the LEDs (22), change the color of the LEDs (22), and perform other operational functions. Although described separately, the light control module (46), light transceiver (32), and microprocessor (34) can be integral with one another, i.e., comprise a single intelligent unit, or combined to form more than one intelligent unit.

An existing electrical power grid (40) in the geographical territory supplies electrical energy to the light assemblies (20) including LEDs (22) and existing electrical transformers (48) in the power grid control the flow of energy to the light assemblies (20). The light assemblies (20) are divided into electrical groups (38) by the electrical transformers (48), with each electrical group (38) being supplied electrical energy from one of the electrical transformers (48).

Figure 2:
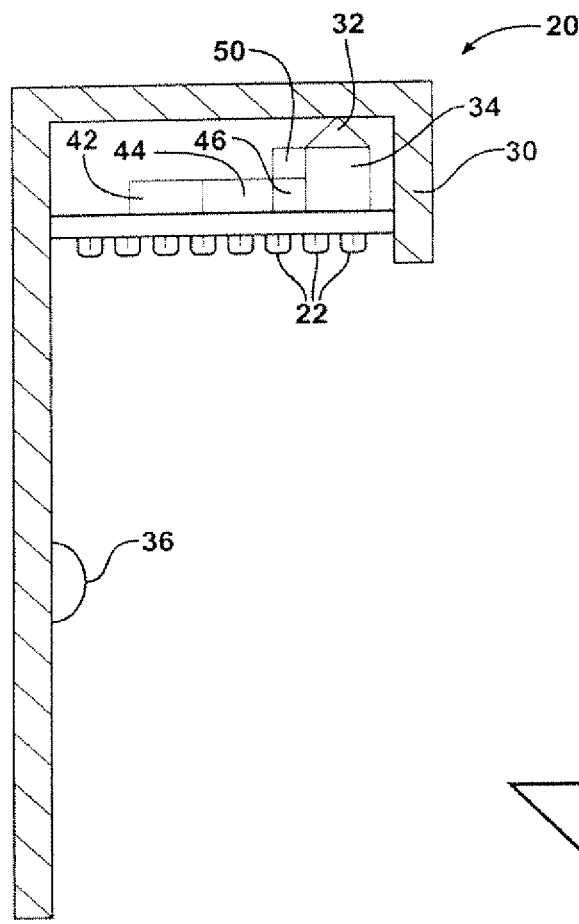
FIG. 2 is schematic view of the light assembly.
Figure 3:
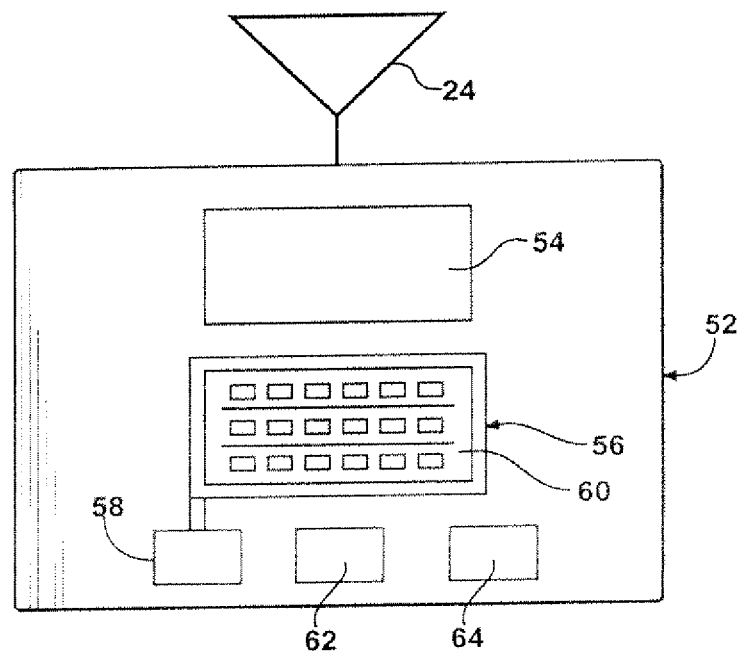
FIG. 3 is a schematic view of the central system controller.

An optional enhancement of the system includes a plurality of emergency signaling devices (36), which are activated by an individual during an emergency situation to broadcast an emergency digital radio signal to the nearest light transceivers (32). In the elective or additional mode, the emergency signaling devices (36) comprise remote key fobs distributed to individuals residing in the same geographical area as the light assemblies (20), as shown in FIG. 1. The emergency signaling devices (36) may also include an emergency button located at each light assembly (20), as shown in FIG. 2. Each key fob has a personal address, unique to the key fob, for identifying the owner of the key fob. The emergency digital radio signals are transmitted without a CTCSS tone on the reserved channels of frequencies directly to the nearest light transceivers (32) and not to the repeaters (26). The associated microprocessors (34) actuate the light control modules (46) in response to the emergency digital radio signal to flash the LEDs (22) of the light assemblies (20) or to perform another function drawing attention to the light assemblies (20).

In a more specific embodiment, each light transceiver (32) includes a signal strength measurement device (50) for measuring the strength of the emergency digital radio signals received by the associated light transceiver (32). The signal strength measurement device (50) can also be used to measure the strength of other radio signals received by the light transceiver (32). The associated microprocessors (34) generate digital data representing the signal strength and the digital data can be stored by the light assembly (20) or encoded in digital radio signals for transmission to the central transceiver (24). The one light transceiver (32) receiving the strongest emergency digital radio signal is the one nearest to the emergency signaling device (36).

Upon receiving the emergency digital radio signal, the microprocessor (34) initiates an emergency LED radio signal for transmission to the repeaters (26) and then to the central transceiver (24) on the reserved channels of frequencies. The emergency LED radio signal is encoded with digital data representing the personal address of the emergency signaling device (36), the fixed digital addresses of the light assemblies (20) receiving the emergency signals, and the digital data representing the measured signal strengths.

The system includes a central system controller (52) interfacing the central transceiver (24) and operated by the political territory or an individual employed by the governing organization in the geographical territory. The central system controller (52) includes a computer (54) for evaluating the digital data encoded in the radio signals received by the central transceiver (24) and for initiating the LED radio signals to light transceivers (32) for controlling the light assemblies (20). The computer (54) includes a storage unit (44) for storing digital data and information pertaining to the system.

In a more specific embodiment, the central system controller (52) also includes a video display (56) for displaying the geographical location of each light assembly (20). The video display (56) typically comprises a color screen for displaying a map of the light assemblies (20) located on streets and sidewalks in the geographical territory. The video display (56) can also display the digital addresses of each light assembly (20). In a more specific embodiment, the central system controller (52) includes a selection device (58) for selecting and assigning the dynamic digital addresses to at least two of the light assemblies (20) displayed on the street map (60). The system controller is capable of segregating all of the light assemblies (20) into operational groups (38). An employee of the governing organization located at the central system controller (52) can use the video display (56) to select and assign the dynamic digital addresses, or the central system controller (52) can be intelligently programmed to assign them. The fixed digital addresses are typically assigned at the time the microprocessor (34) is installed in the light assembly (20), however, it may be assigned during manufacture. The fixed and dynamic digital addresses allow the central system controller (52) to initiate LED radio signals for controlling select light assemblies (20) or operational groups (38) independent of the other light assemblies (20) and other operational groups (38). The digital addresses also allow the central system controller (52) to identify the light assembly (20) or operational group (38) transmitting the digital data encoded in the radio signals.

In a more specific embodiment, the central system controller (52) includes a condition survey unit (62) for initiating an LED radio signal to the light assemblies (20) to determine the condition of the light assemblies (20). In response to those LED radio signals, the light assemblies (20) transmit digital radio signals encoded with digital data representing LED (22) failure, temperature, irregular operation, light transceiver (32) malfunctioning and other characteristics pertaining to the light assembly (20), which is stored in the microprocessors (34). Digital data representing the condition of the light assemblies (20) is transmitted to the central system controller (52) for evaluation and storage in the computer (54).

The central system controller (52) also includes a signal strength voting algorithm program or device (64) for evaluating the signal strengths measured by the signal strength measurement device (50) to determine the proximate location in latitude and longitude of the emergency signaling device (36), or other device transmitting radio signals to the light assemblies (20). The nearest light transceiver (32) is determined by the strongest signal strength or by comparing the relative strength detected by nearby light transceivers. The central system controller (52) can then provide public safety personnel with instructions to proceed to the proximate location of the emergency signaling device (36) and the individual in trouble. Also, the central system controller can be programmed to contact 9-1-1 emergency services and provide instructions to proceed to the proximate location of the emergency signaling device (36) upon receiving the emergency LED radio signal. The central system controller (52) can identify the individual owning the emergency signaling device (36) based on the personal address of the emergency signaling device (36), which is encoded in the emergency LED radio signal.

Although the central system controller (52), central transceiver (24), computer (54), storage unit (44), video display (56), selection device (58), signal strength voting algorithm program or device (64), and condition survey unit (62) are presented as independent elements, they can be in an integral unit, i.e., comprise a single intelligent unit, or combined in a variety of ways to form several intelligent units.

The subject invention also includes a method for transmitting and receiving radio signals to and from street light assemblies (20) including LEDs (22) spaced over a geographical territory defined by a central dispatch of public service personnel operating in the geographical territory.

The method includes transmitting voice and tones on a first personnel radio frequency reserved for public safety personnel from a central transceiver (24) to a plurality of repeaters (26) spaced throughout the in the geographical territory. The voice and tones are re-transmitted on the different second personnel radio frequency from the repeaters (26) to personnel transceivers (28) located in the geographical territory with public safety personnel. The method further includes transmitting voice and tones on the first personnel radio frequency from the personnel transceivers to the repeaters, and then re-transmitting the voice and tones on the different second personnel radio frequency from the repeaters (26) to the central transceiver (24).

The method further includes transmitting an LED radio signal having digital packets encoded with digital data on a first radio frequency reserved for public safety personnel from the central transceiver (24) to the repeaters (26). The LED radio signal is re-transmitted on a different second radio frequency reserved for public safety personnel from the repeaters (26) to a plurality of light transceivers (32) disposed in the housing (30) of light assemblies (20) including LEDs (22) and spaced throughout the geographical territory. The method further includes transmitting digital radio signals on a return radio frequency reserved for public safety personnel from the light transceivers (32) to the repeaters (26). The digital radio signal is re-transmitted on a different return radio frequency reserved for public safety personnel from the repeaters (26) to the central transceiver (24). As alluded to above, the first radio frequency and different second radio frequency employed during the transmission of radio signals between the central transceiver (24) and light transceivers (32) are typically the same pair of frequencies as the first personnel radio frequency and different second personnel radio frequency employed during the transmission of radio signals between the central transceiver (24) and personnel transceivers (28).

As alluded to above, in a more specific embodiment, the method includes assigning a microprocessor (34) associated with each of the light assemblies (20) a fixed digital address, which can be done at the time of manufacturing the microprocessor (34) or installation in the light assembly (20). The method can further comprise displaying a street map (60) showing the geographical location on streets of each light assembly (20) and its fixed digital address on a video display (56) of a central system controller (52). A central system controller (52), or individual at the central system controller (52), can employ the video display (56) and a selection device (58), e.g., a mouse, in the central system control to select and assign a dynamic digital address to a microprocessor (34) associated with each light assembly (20) of the light assemblies (20) to segregate the light assemblies (20) into operational groups (38). The method further comprises storing the digital addresses of the microprocessors (34) and the geographical locations of the light assemblies (20) in a storage unit (44) in the microprocessor (34), and in a computer (54) of the central system controller (52).

The method involves employing the existing infrastructure in a geographical territory, including supplying electrical power to a plurality of electrical transformers (48) disposed throughout an electrical power grid (40), supplying power from electrical transformers (48) to a plurality of the light assemblies (20) in the electrical power grid (40), and controlling the flow of electricity to the LEDs (22) of each light assembly (20) with a light control module (46) associated with each light assembly (20).

The method further comprises the central system controller (52) initiating the transmission of LED radio signals having digital packets and encoded digital data to the light assemblies (20). As alluded to above, the initiated LED radio signals are transmitted on a first radio frequency from the central transceiver (24) to the repeaters (26), and re-transmitted on a different second radio frequency from the repeaters (26) to light transceivers (32) disposed in a housing (30) of each light assembly (20). The method can include encoding the LED radio signals with the digital address of at least one of the microprocessors (34) for controlling the light assemblies (20) having those digital addresses independent of the other light assemblies (20) and the other operational groups (38). The method can further include encrypting or encoding the LED signals with digital data for preventing "hacking," interference, and corruption of the communications.

The method further comprises electronically transferring the digital data encoded in the LED radio signals to the microprocessors (34) of the associated light assemblies (20) receiving the LED radio signals. Next, the method includes processing the digital packets encoded with the digital data by the microprocessors (34). In one embodiment of the present invention, when the LED radio signals are encoded with digital addresses, the microprocessors (34) can be programmed to process the digital packets only if the digital data includes the fixed or dynamic digital address assigned to that microprocessor (34). In other words, the light assemblies (20) can reject radio signals encoded with digital addresses other than their own. Next, the microprocessors (34) of the light assemblies (20) receiving the LED radio signal actuate the associated light control module (46) in response to the digital data encoded in the LED radio signal. If the LED radio signals are encoded with the digital addresses, then the actuating occurs by the light control modules (46) of the light assemblies (20) having the digital addresses independent of the other light assemblies (20). The actuating can include turning the LEDs (22) on or off, flashing the LEDs (22), changing the color of the LEDs (22), changing the amount of electrical power supplied to the LEDs (22), or another functional operation.

The method further comprises sensing the condition of the light assemblies (20) by a condition sensor (42) associated with the microprocessor (34) of each light assembly (20), and then storing digital data representing the operational condition of the light assembly (20) in the microprocessor (34). The condition sensing may be a response to an LED radio signal initiated by the central system controller (52). For example, the central system controller (52) can be programmed to conduct a survey of the condition of each light assembly starting at a eleven o'clock every night. Groups of light assemblies may be surveyed sequentially by cycling through the appropriate digital addresses. After the condition is determined, the associated microprocessors (34) initiate digital radio signals encoded with the digital data representing the condition of the light assembly (20). The associated light transceiver (32) transmits the digital radio signal on a return radio frequency reserved for public safety personnel from the light transceiver (32) to the repeaters (26). The repeaters (26) re-transmit the digital radio signal on a different return radio frequency to, the central transceiver (24). Next, the central transceiver (24) electrically transfers the digital data representing the condition of the light assembly (20) to the central system controller (52). The central system controller (52) stores the digital data representing the condition of the light assembly (20) in the computer (54).

In the elective or additional mode, the method comprises employing a plurality of emergency signaling devices (36) associated with the light assemblies (20). The emergency signaling devices (36) broadcast and emergency digital radio signal on the channels of frequencies reserved for public safety personnel to the light transceiver (32) of at least one of the light assemblies (20). The additional mode can comprise assigning a unique personal digital address to each of the emergency signaling devices (36). The emergency signaling devices (36) can be distributed or sold to individuals in the geographical territory The method can include displaying the geographical location of the light transceiver (32) receiving the strongest emergency digital radio signal on the video display (56) of the central system controller (52) so that an individual located at the central system controller (52) can view the proximate geographical location of the emergency signaling device (36). Finally, the central system controller (52) or individual can transmit instructions to the public safety personal to proceed to the latitude and longitude of the light transceiver (32) receiving the strongest emergency digital radio signal.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A system for transmitting and receiving radio signals to street light assemblies (20) including light emitting diodes (22) and spaced over a geographical territory defined by a central dispatch of public service personnel operating in the geographical territory, said system comprising;
   a central system controller (52) for initiating the transmission and receipt of voice and tones and digital packets encoded with digital data on channels of radio frequencies reserved for public safety personnel in the geographical area,
   a central transceiver (24) interfacing said central system controller (52) transmitting and receiving said voice and said tones and said digital packets,
   a plurality of repeaters (26) for receiving said voice and said tones and said digital packets on a first radio frequency and re-transmitting said voice and said tones and said digital packets on a different second radio frequency,
   a plurality of personnel transceivers (28) located with public safety personnel for receiving said voice and said tones on said different second radio frequency and for transmitting said voice and said tones on said first radio frequency reserved for public safety personnel to said repeaters (26) for re-transmission to said central transceiver (24),
   a plurality of light assemblies (20) each including a plurality of light emitting diodes (22) and a microprocessor (34) for processing and storing digital data and each having a fixed digital address different from the fixed digital addresses of the other microprocessors (34) and a dynamic digital address for being assigned the same dynamic digital address as at least one other microprocessor (34) by said central system controller (52),
   each of said light assemblies (20) including a light transceiver (32) for receiving an LED radio signal having said digital packets encoded with digital data on said different second radio frequency initiated by said central system controller (52) for actuating the associated light assembly (20) independently of the other light assemblies (20) and for transmitting digital radio signals having digital packets encoded with digital data including said digital addresses of said microprocessor (34) on said first radio frequency to said repeaters (26) and ultimately to said central system controller (52),
   a plurality of emergency signaling devices (36) for broadcasting an emergency digital radio signal on said channels of radio frequencies to the nearest light transceivers (32) to actuate said microprocessors (34) for initiating an emergency LED radio signal on said channels of radio frequencies reserved for public safety personnel to said central system controller (52),
   each of said light transceivers (32) including a signal strength measurement device (50) for measuring the strength of said emergency digital radio signal and for generating emergency digital data representing said strength for transmission via said emergency LED radio signals to said repeaters (26) and ultimately to said central system controller (52), and
   said central system controller (52) including a signal strength voting algorithm program or device (64) for comparing and determining the one light transceiver (32) receiving the strongest emergency digital radio signal to provide the proximate geographical location in latitude and longitude of said emergency signaling device (36) broadcasting said emergency digital radio signal.

2. A system as set forth in claim 1 wherein said central system controller (52) includes a selection device (58) for selecting and assigning a dynamic digital address to at least two of said light assemblies (20) to segregate at least two of the selected light assemblies (20) into one operational group (38).

3. A system for transmitting and receiving radio signals to street light assemblies (20) including light emitting diodes (22) and spaced over a geographical territory defined by a central dispatch of public service personnel operating in the geographical territory, said system comprising:
   a central transceiver (24) located in the geographical territory transmitting and receiving voice and tones and digital packets encoded with digital data on channels of radio frequencies reserved for public safety personnel,
   a plurality of repeaters (26) spaced from one another throughout the geographical territory for receiving said voice and said tones and said digital packets on a first radio frequency and re-transmitting said voice and said tones and said digital packets on a different second radio frequency,
   a plurality of personnel transceivers (28) located throughout the geographical area with public safety personnel for receiving said voice and said tones on said second radio frequency from said repeaters (26) and for transmitting said radio signals having said voice and tones on said first radio frequency reserved for public safety personnel to said repeaters (26) for re-transmission to said central transceiver (24), a plurality of light assemblies (20) spaced throughout the geographical territory and each including a plurality of light emitting diodes (22) for emitting light, each of said light assemblies (20) including a housing (30) for covering and protecting said light emitting diodes (22), an electrical power grid (40) in the geographical territory for supplying electrical energy to said light assemblies (20), a plurality of electrical transformers (48) in said electrical power grid (40) for controlling the flow of electricity to said light assemblies (20), said light assemblies (20) being divided into electrical groups (38) by said electrical transformers (48) with each electrical group (38) being supplied electrical energy from one of said electrical transformers (48), each of said light assemblies (20) including a light control module (46) disposed within said housing (30) for controlling the flow of electricity supplied to said light emitting diodes (22) of said light assemblies (20), each of said light assemblies (20) including a microprocessor (34) disposed within said housing (30) and having a fixed digital address different from the fixed digital addresses of the other microprocessors (34) and a dynamic digital address for being assigned the same dynamic digital address as at least one other microprocessor (34) for operationally grouping said light assemblies (20) in operational groups (38) for independently actuating said light control module (46) of said light assemblies (20) in each operational group (38), a central system controller (52) including a video display (56) for displaying a street map (60) showing the geographical locations on streets of each of said light assemblies (20), said central system controller (52) including a selection device (58) for selecting and assigning a dynamic digital address to at least two of said microprocessors (34) of the selected light assemblies (20) displayed in said street map (60) to segregate at least two of said selected light assemblies (20) into one of said operational groups (38), each of said microprocessors (34) including a storage unit (44) for storing digital data including said digital addresses and the geographical location in latitude and longitude of said light assemblies (20), said central system controller (52) including a computer (54) interfacing with said central transceiver (24) for initiating the transmission of LED radio signals having digital packets encoded with digital data including said digital addresses on said different second radio frequency to said repeaters (26), each of said light assemblies (20) including a light transceiver (32) disposed in said housing (30) and interfacing with said microprocessor (34) of said light assembly (20) for receiving said LED radio signals having said digital packets encoded with said digital data including said digital addresses of said microprocessors (34) for processing by said microprocessors (34) to actuate the associated light control module (46) in response to said digital data including said digital addresses independently of the other light assemblies (20), each of said microprocessors (34) including a condition sensor (42) for sensing the condition of said light assembly (20) and storing digital data representing the condition of said light assembly (20) and initiating digital radio signals having digital packets encoded with said digital data representing the condition of said light assembly (20) for transmission from the associated light transceiver (32) on said first radio frequency reserved for public safety personnel to said repeaters (26) and ultimately to said central system controller (52), said central system controller (52) including a condition survey unit (62) for initiating an LED radio signal having digital packets encoded with digital data from said central transceiver (24) to said light transceivers (32) and ultimately to the associated condition sensors (42) for obtaining said digital data representing the condition of the associated light assembly (20) from said condition sensor (42) and storing said digital data representing the condition of said light assembly (20) in said computer (54), a plurality of emergency signaling devices (36) each having a personal digital address different from the personal digital address of the other emergency signaling devices (36) for broadcasting an emergency digital radio signal on said channels of radio frequencies reserved for public safety personnel to the nearest light transceivers (32) to actuate said microprocessor (34) of at least one of said nearest light assemblies (20) for actuating said light control module (46) and for initiating an emergency LED radio signal having a digital packet and encoded with said personal digital address and said fixed digital address therein on said channels of frequency reserved for public safety personnel from said light transceivers (32) to said repeaters (26) and ultimately to said central system controller (52), each of said light transceivers (32) including a signal strength measurement device (50) for measuring the strength of said emergency digital radio signal and for generating emergency digital data representing said signal strength for transmission via said emergency LED radio signals to said repeaters (26) and ultimately to said central system controller (52), and said central system controller (52) including a signal strength voting algorithm program or device (64) for comparing and determining the one light transceiver (32) receiving the strongest emergency digital radio signal to provide the proximate geographical location in latitude and longitude of said emergency signaling device (36) broadcasting said emergency digital radio signal.

4. A method for transmitting and receiving radio signals to street light assemblies (20) including light emitting diodes (22) and spaced over a geographical territory defined by a central dispatch of public service personnel operating in the geographical territory, said method comprising:

transmitting voice and tones and digital packets on channels of frequencies reserved for public safety personnel from a central transceiver to a plurality of repeaters (26) spaced throughout the geographical territory, re-transmitting the voice and the tones on channels of frequencies reserved for public safety personnel from the repeaters to personnel transceivers (28) located with public safety personnel throughout the geographical territory, assigning a fixed digital address to a microprocessor (34) associated with a light assembly (20) having light emitting diodes (22) and spaced throughout the geographical territory and assigning a different fixed digital address to the other microprocessors (34) each of the other light assemblies (20) spaced throughout the geographical territory, assigning a dynamic digital address to one of the microprocessors (34) and assigning the same dynamic digital address to at least one of the other microprocessor (34) by the central system controller (52) to segregate the light assemblies (20) into operational groups (38), transmitting an LED radio signals having the digital packets and encoded with digital data including digital data representing at least one of the digital addresses on the channels of frequencies reserved for public safety personnel to a light transceiver (32) associated with each of the light assemblies (20) having light emitting diodes (22) spaced throughout the geographical territory, actuating the microprocessors (34) of the light assemblies (20) having the digital addresses encoded in the radio signals independent of the other light assemblies (20), actuating the light emitting diodes (22) of the light assembly (20) by a light control module (46) interfacing the microprocessor (34) having the digital address in response to the digital data encoded in the radio signals, broadcasting an emergency digital radio signal on the channels of radio frequencies reserved for public safety personnel from an associated emergency signaling device (36) to the nearest light transceivers (32), actuating the microprocessors (34) of the light assemblies (20) receiving the emergency digital radio signal, measuring the strength of the emergency digital radio signals received by the light transceivers (32) by a signal strength measurement device (50) in the light transceiver (32) and generating emergency digital data representing the signal strength by the microprocessor (34) interfacing the light transceiver (32), transmitting an emergency LED radio signal encoded with signal strength and the fixed digital addresses of the associated microprocessors (34) therein on the channels of frequencies reserved for public safety personnel from the light transceiver (32) to the central system controller (52), and determining the one light transceiver (32) receiving the strongest emergency digital radio signal to provide the proximate geographical location of the emergency signaling device (36) broadcasting the emergency digital radio signal by a signal strength voting algorithm program or device (64) in the central system controller (52).

5. A method as set forth in claim 4 further comprising transmitting instructions to the public safety personnel to proceed to the geographical location of the light transceiver (32) receiving the strongest emergency digital radio signal.

6. A method as set forth in claim 4 further comprising displaying the geographical location of the light transceiver (32) receiving the strongest emergency digital radio signal on a video display (56) included in the central system controller (52).

7. A method as set forth in claim 4 further comprising transmitting digital packets encoded with digital data representing the condition of the light assembly (20) from the associated light transceiver (32) to the repeaters (26) for re-transmission to the central system controller (52).

8. A method for transmitting and receiving radio signals to street light assemblies (20) including light emitting diodes (22) and spaced over a geographical territory defined by a central dispatch of public service personnel operating in the geographical territory, said method comprising:

transmitting voice and the tones and digital packets encoded with digital data on a first radio frequency reserved for public safety personnel from a central transceiver (24) to a plurality of repeaters (26) located in the geographical territory, re-transmitting the voice and the tones on a different second radio frequency reserved for public safety personnel to a plurality of personnel transceivers (28) located in the geographical territory with public safety personnel, transmitting the digital packets encoded with the digital data on the first radio frequency reserved for public safety personnel from the personnel transceivers (28) to the repeaters (26), re-transmitting the voice and the tones on the different second radio frequency from the repeaters (26) to the central transceiver (24), supplying electrical power to a plurality of electrical transformers (48) disposed throughout an electrical power grid (40), supplying power from each electrical transformer (48) to a plurality of light assemblies (20) in an electrical group (38) and each including electrically driven light emitting diodes (22) and spaced over the geographical area, controlling the flow of electricity to the light emitting diodes (22) of each light assembly (20) with a light control module (46) associated therewith, displaying a street map (60) showing the geographical location on streets of each of the light assemblies (20) on a video display (56) of a central system controller (52), assigning a fixed digital address to a microprocessor (34) associated with each light assembly (20) and assigning a different fixed digital address to the other microprocessors (34) of the light assemblies (20), selecting and assigning a dynamic digital address to the microprocessors (34) of the light assemblies (20) displayed in the street map (60) by a selection device (58) of the central system controller (52) to segregate the light assemblies (20) into operational groups (38), selecting and assigning the same dynamic digital address to at least two of the microprocessors (34) of the light assemblies (20) displayed in the street map (60) to segregate at least two of the selected light assemblies (20) into one operational group (38), storing the digital addresses of the microprocessors (34) in a computer (54) included in the central system controlled (52), storing the digital addresses of the microprocessors (34) and the geographical location of the microprocessors (34) in a storage unit (44) in the microprocessor (34), initiation the transmission of LED radio signals having the digital packets encoded with digital data including the digital address of at least one of the light assemblies (20) by a central system controller (52) ultimately for the light assemblies (20), initiating the transmission of LED radio signals having the digital packets encoded digital data including the digital addresses of at least one of the microprocessors (34) by the computer (54) of the central system controller (52) to actuate the light control modules (46) of the light assemblies (20) having the microprocessors (34) having the digital addresses encoded in the LED radio signals independent of the other light assemblies (20), transmitting the LED radio signals having the digital packets initiated by the computer (54) on the first radio frequency from the central transceiver (24) to the repeaters (26), re-transmitting the LED radio signals having with the digital packets on the different second radio frequency from the repeaters (26) to the light transceivers (32) of the light assemblies (20), rejecting the LED (22) radio signals encoded with digital addresses of other light assemblies (20) by the microprocessor (34) of each light assembly (20), processing the digital packets encoded with the digital data including the digital addresses by the microprocessors (34) having the digital addresses encoded in the LED radio signal received by the light transceivers (32) of the assemblies independent of the other light assemblies (20), actuating the light control module (46) by the microprocessor (34) having the digital address encoded in the LED radio signal in response to the digital packets with the digital data, sensing the condition of the light assemblies (20) represented by digital data in a condition sensor (42) of the microprocessor (34) and storing the digital data representing the condition of the light assembly (20) in the microprocessor (34), initiating digital radio signals having a digital packet encoded with the digital data representing the condition of the light assembly (20) by the associated microprocessor (34), transmitting the digital radio signals having digital packets encoded with the digital data representing the condition of the light assembly (20) and the digital addresses on the first radio frequency from the light transceiver (32) to the repeaters (26), re-transmitting the digital packet encoded with the digital representing the condition of the light assembly (20) and the digital addresses on the different second radio frequency from the repeaters (26) to the central transceiver (24), electronically transferring the digital data representing the condition of the light assembly (20) encoded in the digital packets from the central transceiver (24) to the central system controller (52), storing the digital data representing the condition of the light assembly (20) in the computer (54) of the central system controller (52), assigning a personal digital address to a plurality of emergency signaling devices (36) and assigning a different personal digital address to the other emergency signaling devices (36), broadcasting an emergency digital radio signal from one of the emergency signaling devices (36) without the voice and the tones and encoded with the associated personal digital address on the channels of radio frequencies reserved for public safety personnel to the nearest light transceivers (32) of the light assemblies (20), actuating the microprocessor (34) of at least one of the nearest light assemblies (20) in response to the emergency digital radio signal, actuating the light control modules (46) to supply electrical power to the light emitting diodes (22) of the light assemblies (20) receiving the emergency digital radio signal, measuring the strength of the emergency digital radio signal received by the light transceiver (32) by a signal strength measurement device (50) in the light transceiver (32) and generating emergency digital data representing the signal strength by the microprocessor (34) interfacing the light transceiver (32), initiating an emergency LED (22) radio signal having a digital packet encoded with the digital data representing the signal strength and the personal address of the emergency signaling device (36) and the fixed digital address of the microprocessor (34) by the microprocessors (34) of the nearest light assemblies (20) ultimately for the central system controller (52), transmitting the emergency LED radio signal having the digital packet encoded with digital data initiated by the microprocessor (34) on the channel of radio frequencies reserved for public safety personnel from the light transceiver (32) to the repeaters (26), re-transmitting the emergency LED radio signals having the digital packet on the channels of radio frequencies reserved for public safety personnel from the repeaters (26) to the central transceiver (24), electronically transferring the digital data encoded in the emergency LED radio signals from the central transceiver (24) to the central system controller(52), determining the one light transceiver (32) receiving the strongest emergency digital radio signal to provide the proximate geographical location in latitude and longitude of the emergency signaling device (36) broadcasting the emergency digital radio signal by a signal strength voting algorithm program or device (64) in the central system controller (52), displaying the geographical location of the light transceiver (32) receiving the strongest emergency digital radio signal on the video display (56) included in the central system controller (52), and transmitting instructions to the public safety personnel to proceed to the latitude and longitude of the light transceiver (32) receiving the strongest emergency digital radio signal.

\* \* \* \* \*